June 2, 1925.

W. H. PRATT 1,539,865

ATTACHMENT FOR TIRE VALVES

Filed Aug. 17, 1921

Inventor
William H. Pratt

By J. Beau Kelly, Attorney

Patented June 2, 1925.

1,539,865

UNITED STATES PATENT OFFICE.

WILLIAM H. PRATT, OF KINGSTON, NEW YORK.

ATTACHMENT FOR TIRE VALVES.

Application filed August 17, 1921. Serial No. 493,003.

*To all whom it may concern:*

Be it known that I, WILLIAM H. PRATT, a citizen of the United States, residing at Kingston, in the county of Ulster and State of New York, have invented certain new and useful Improvements in an Attachment for Tire Valves, of which the following is a specification.

The invention relates to valves for pneumatic tires and particularly to a valve having means for relieving a tire of excess pressure.

A still further object is to provide a valve of the character set forth which can be applied directly to the inner tube itself or used, as an attachment to the usual tire valve.

Various other objects and advantages of the invention will become apparent during the continuance of the following description.

In the drawings:—

In describing the invention in detail, 10 indicates the cylindrical body portion of the valve having a nozzle 11 integral with one end and provided with an internally threaded neck portion 12 adapted to engage over the threads of the ordinary valve usually carried by the inner tube of a tire.

Figure 4:
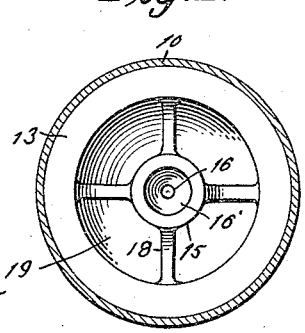
Figure 4 is a top plan view of the bottom end of the valve cylinder, the closing wall of the cylinder being shown in section.
Figure 5:
Figure 5 is a sectional detail view of the lower end of the valve-stem, showing the extension rod carried thereby.

Nozzle 11 is of relatively thick cross section and provides, on the inside of the cylinder, an annular shoulder or valve seat 13 upon which valve disc 14 of the valve stem is adapted to rest when in lowermost position. As shown in the plan view of Figure 4, the nozzle is provided at its center with a vertically disposed core 15 having a vertical passage way 16 terminating in a conical enlargement 16′ forming a seat or bearing for the lower end 17 of the valve-stem. Core 15 is braced radially of seat 16′ of the nozzle by means of vertically extending webs 18, defining air passages 19 communicating with the interior of cylinder 10 at one end and with threaded bore 12 of the nozzle at the other end. The upper face of core 15 provides, also, a support or seat 15′ upon which is adapted to rest that portion of the disc 14 which surrounds the opening through which extends the valve stem 25. It will thus be seen that the disc, when seated to close the air passages 19, rests upon the two circular seats 34 and 15′, between which the air is conducted by way of passages 19.

Inserted in the upper end of cylinder 10 and in screw threaded engagement therewith is a cylinder cap 20 having a threaded bore to adjustably support a tensioning bonnet 21. The outer end of the bonnet is formed into a polygonal shaped head 22 to permit of the bonnet being manually adjusted and encircling the bonnet inwardly of the head is a limiting flange 23, which is adapted to abut with washer 24 for limiting the inward adjustment of the bonnet. The bonnet is provided with a longitudinally extending threaded bore having engagement with the threaded portion of valve stem 25 which extends vertically through the bonnet as shown to advantage in Figure 1.

The upper end of the valve-stem is threaded, as at 26, to provide for connection with an air hose and leading inwardly of the stem from the threaded portion is an air passage 27. This passage terminates at a suitable point in the stem below the cylinder cap and discharges into the interior of the cylinder through outlet openings 28. At the lower end of the stem above the end 17, a collar 29 is provided, which collar serves as a support for a plunger 30. This plunger is mounted for sliding movement on the valve stem and is adapted to have a snug sliding fit with the inner wall of cylinder 10. On its upper side, the plunger is provided with an annular flanged spring seat 31 and on its under side it has a cupped depression in which is received a valve disc 14. The disc and plunger are respectively threaded to provide for separable engagements relative to one another and also have opposed central portions recessed to provide an enclosed space 32 confining collar 29 of the valve stem.

Figure 1:
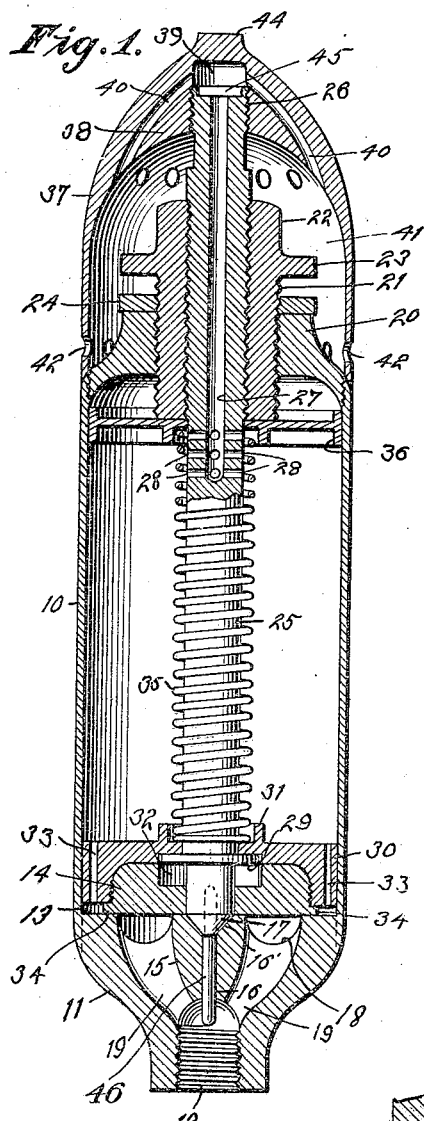
Figure 1 is a vertical, longitudinal, sectional view of the valve, showing all parts assembled and in operative position.
Figure 2:
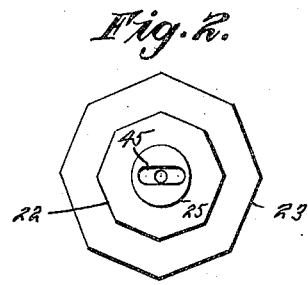
Figure 2 is a top plan view of the spring-tensioning bonnet.
Figure 3:
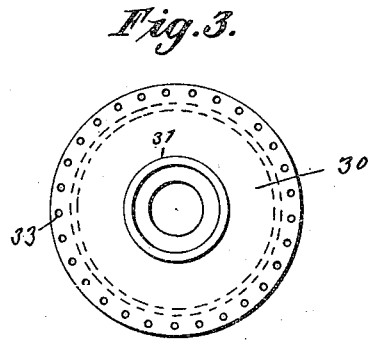
Figure 3 is a top plan view of the valve-stem plunger.

Plunger 30 is provided with a series of circumferentially arranged openings 33 extending vertically therethrough at fixed distances apart and disc 14 is provided with an annular extension 34, adapted to extend under the plunger, for holding the latter spaced upwardly above seat 13, as shown to advantage in Figure 1, this arrangement permitting the lower terminals of openings 33 from being closed by the seat.

Encircling the valve-stem with one end firmly engaged in the spring seat of the plunger is a coil spring 35. The opposite end of this spring bears against follower 36, likewise carried by the valve-stem and normally positioned against the lower end of tensioning bonnet 21. By adjusting the bonnet vertically through the cylinder cap, the follower is moved to either compress spring 35 or permit expansion thereof and by thus manipulating the bonnet it is possible to adjust the spring to such a tension as to counterbalance the maximum pressure of the inner tube.

Enclosing the bonnet and cylinder cap is a dust cap 37 having a centrally threaded portion 38 for receiving the upper threaded end 26 of the valve-stem.

An air space 39 is provided at inner terminal of the threaded bore and has communicating therewith a plurality of radially disposed passageways 40, the latter opening into the air space 41 provided inwardly of the closing side walls of the cap. Adjacent the lower edge of the cap, in proximity to the joint between the latter and cylinder 10, are a plurality of outlet openings 42 extending circumferentially about the cap and providing outlet means from the air chamber 41. The cap is supported in position by means of its threaded engagement with the valve-stem and is provided, on its exterior side, with a bit 44 serving as a screw driver engageable with the bit-slot 45 provided transversely of the upper end of the valve-stem. By reason of the bit, the handle may be conveniently employed in adjusting the valve-stem through the adjusting bonnet.

As a means of adapting the invention for use in connection with the conventional type of inner tube valve, the lower end of the stem is provided with an extension in the form of a pin 46 having threaded engagement in a recess in the lower end 17 of the stem and of a length sufficient to permit it to operate through bore 16 of the nozzle core and press down the vertical pin encased in said inner tube valve for releasing the latter and allowing the air to escape upwardly into the attached valve.

In using the invention, the valve is attached in place with the dust cap removed and the stem unscrewed sufficiently to unseat disc 14. The upper end of the valve-stem may then be attached to a suitable air hose and when inflating a tire, the air flows from the hose into and down through the vertical passage way of the valve-stem, escaping into the interior of cylinder 10 from whence it passes through openings 33 of the plunger, between webs 18 and downwardly into the inner tube which may be inflated to its maximum capacity. Upon the tire being sufficiently inflated, the valve-stem of the device is screwed down to seat end 17 firmly, collar 29 of the stem moving easily in space 32 if it should happen that the pressure of the air impinging upon the under side of the plunger and disc should tend to maintain the same in a raised position. Spring bonnet 21, however, may be adjusted inwardly of the cylinder 10 for lowering follower 36 and compressing spring 35 to a tension calculated to balance with the predetermined maximum air pressure set for the tire, said pressure being determined and tested by the usual dial gauge. After the spring has thus been properly tensioned by the adjusting of the tensioning bonnet, cap 37 is screwed in place and the valve is then set to operate automatically for discharging any surplus pressure within the tire above the predetermined limit. When the pressure of the spring above and the pressure of the air from below are equal the plunger and disc element will remain engaged with seats 13 and 15' thereby preventing any escape of pressure from the tire through the valve and consequently maintaining the same at a normally high pressure inflation. In this connection it is well to note the function and advantages of the bridge structure formed in the nozzle by the core 15 and the supporting webs 18. This structure permits, in the first instance, of having in the center of same a channel or air passageway 16 to the inner tube and at the same time a conical seat 16' wherein the lower tapered end 17 of the valve stem is adapted to rest. Hence, the air that has been delivered to the inner tube is held in check from escape through passageway 16 by the end of the valve stem being in its conical seat. The arrangement permits, also, of having on the outer rim of the core a seating space for the disc 14 so that there will be no back leakage between the seated disc and the valve stem. It will be observed that when the disc is moved upwardly, it lifts itself off of two seats; one seat 15' being near the valve stem and the other seat 34 surrounding the nozzle opening, the end 17 of the valve stem remaining seated in the conical seat during the automatic lifting of the valve to purge the tire of excess pressure and being unseated therefrom only when the valve stem is unscrewed, as when inflating the tire.

However, should the pressure within the tire for any reason become increased, the plunger and disc element will be forced upwardly along the valve-stem, the space 32 permitting such movement to be easily effected without interfering with the valve-stem and the unseating of the disc permits the excess air to escape upwardly through the circumferential openings of the plunger, into the interior of the disc, through the vertical passage way of the valve-stem and into air chamber 41 through conduit 40. From 41 the excess pressure is permitted to escape to the atmosphere through openings 42 and upon return of the pressure to normal, the reaction of spring 35 will reseat the plunger and disc, thereby closing the valve.

From the foregoing it is believed that the advantages and novel features of the invention will be readily understood and therefore further detailed description is deemed unnecessary.

What is claimed is:—

1. An attachment for tire valves for relieving a tire of excess pressure, comprising a cylinder internally screw threaded at its lower end for attachment to a tire valve and presenting relatively inner and outer concentric valve seats and an air passage therebetween, said inner valve seat presenting also a central passage therethrough, a valve stem for closing the said central passage, said valve stem being adjustable axially of the said valve seats, a valve carried by the said valve stem and being moveable thereon, a spring engaged with the said valve and normally holding the same upon the said inner and outer valve seats, a pin carried by the end of the valve stem and extending through said central passage to engage the valve stem of the usual tire valve, and means for adjusting the tension of the said spring.

2. An attachment for tire valves for relieving a tire of excess pressure, comprising a cylinder internally screw threaded at its lower end for attachment to a tire valve and presenting relatively inner and outer concentric valve seats at one end thereof, said seats being spaced apart to provide an intervening passage and the said inner seat presenting also a central passage therethrough, a cap inserted in the other end of the cylinder, a valve stem threadedly adjustable through the said cap and having an air passage opening into the cylinder and communicating also with the atmosphere, said valve stem being adapted to close the said central passage, a valve carried by the said valve stem and adapted upon the inward adjustment of the same to seat upon the said inner and outer valve seats, said valve being moveable upon the stem for unseating under pressure, a spring for normally holding the valve upon its seats, a pin carried by the end of the valve stem and extending through said central passage to engage the valve stem of the usual tire valve, and means for adjusting the tension of the said spring.

3. An attachment for tire valves for relieving a tire of excess pressure, comprising a cylinder internally screw threaded at its lower end for attachment to a tire valve and having a nozzle provided with an inwardly disposed annular valve seat, a core concentric with the said annular valve seat and having a central passage terminating at its inner end in a conical seat, supporting webs between the said annular seat and the said core, the said webs being spaced laterally from each other to provide air passages between the core and the annular seat, a valve stem threadedly adjustable in the said cylinder and having its inner end tapered to engage in the said conical seat, a pin carried by the end of the valve stem and extending through said central passage to engage the valve stem to the usual tire valve, a valve mounted on the said stem above the said tapered end of the latter and being engageable with the said annular valve seat and the said core to close the said air passages therebetween, said valve being moveable on the said stem for unseating from the said core and said annular valve seat when forced upwardly by excess pressure in the tire, a spring engaged with the said valve and normally holding the valve upon its seats, and means for adjusting the tension of the said spring.

In testimony whereof I affix my signature.

WILLIAM H. PRATT.